(12) United States Patent
Flack et al.

(10) Patent No.: US 6,288,704 B1
(45) Date of Patent: Sep. 11, 2001

(54) MOTION DETECTION AND TRACKING SYSTEM TO CONTROL NAVIGATION AND DISPLAY OF OBJECT VIEWERS

(75) Inventors: James F. Flack, Los Altos Hills; Sina Fateh, Sunnyvale; David L. Motte, Ben Lomond, all of CA (US)

(73) Assignee: Vega, Vista, Inc., Sunnyvale, CA (US)

( * ) Notice: Subject to any disclaimer, the term of this patent is extended or adjusted under 35 U.S.C. 154(b) by 0 days.

(21) Appl. No.: 09/441,001

(22) Filed: Nov. 9, 1999

Related U.S. Application Data

(63) Continuation-in-part of application No. 09/328,053, filed on Jun. 8, 1999.

(51) Int. Cl.$^7$ .................................................. G09G 5/08
(52) U.S. Cl. .................. 345/158; 345/157; 345/156; 345/121; 345/123
(58) Field of Search ...................... 345/156, 157, 345/158, 121, 123, 125, 127, 341, 339, 7, 973

(56) References Cited

U.S. PATENT DOCUMENTS

| | | | |
|---|---|---|---|
| 4,502,035 | 2/1985 | Obenauf et al. ............... 340/323 |
| 4,649,504 | * 3/1987 | Krouglicof et al. . | |
| 5,148,477 | 9/1992 | Neely et al. ..................... 382/6 |
| 5,177,872 | * 1/1993 | Lewis et al. . | |
| 5,214,711 | 5/1993 | Neely et al. ..................... 782/6 |
| 5,322,441 | 6/1994 | Lewis et al. . | |
| 5,447,305 | 9/1995 | Socci et al. .................... 273/26 |
| 5,482,048 | 1/1996 | Johnson ........................ 128/665 |
| 5,526,022 | * 6/1996 | Donahue et al. ............. 345/156 |
| 5,566,241 | * 10/1996 | Lewis et al. . | |
| 5,581,670 | 12/1996 | Bier et al. ..................... 395/326 |
| 5,602,566 | * 2/1997 | Motosyuku et al. ......... 345/123 |
| 5,617,114 | 4/1997 | Bier et al. ..................... 345/113 |
| 5,666,499 | 9/1997 | Baudel et al. ................ 345/347 |
| 5,686,940 | 11/1997 | Kuga . | |
| 5,689,667 | 11/1997 | Kurtenbach .................. 395/352 |
| 5,774,591 | 6/1998 | Black et al. .................. 382/236 |
| 5,790,769 | 8/1998 | Buxton et al. ................ 395/173 |
| 5,802,220 | 9/1998 | Black et al. .................. 382/276 |
| 5,910,797 | * 6/1999 | Beuk ............................. 345/157 |
| 5,916,181 | 6/1999 | Socci et al. ................... 600/595 |
| 5,926,178 | 7/1999 | Kurtenbach .................. 345/352 |
| 5,930,379 | 7/1999 | Rehg et al. ................... 382/107 |
| 5,973,669 | 10/1999 | Fitzmaurice et al. ......... 345/157 |
| 6,005,482 | 12/1999 | Moran et al. ............... 340/568.8 |
| 6,009,210 | * 12/1999 | Kang ............................ 345/156 |
| 6,115,025 | 9/2000 | Buxton et al. ................ 345/126 |
| 6,115,028 | 9/2000 | Balakrishnan et al. ....... 345/157 |
| 6,118,427 | 9/2000 | Buxton et al. ................ 345/113 |
| 6,148,271 | 11/2000 | Marinelli ...................... 702/141 |
| 6,151,563 | 11/2000 | Marinelli ...................... 702/141 |

FOREIGN PATENT DOCUMENTS

| 3-189683 | * 8/1991 | (JP) . |
| 09305743 | 11/1997 | (JP) . |
| WO 98/36631 | 8/1998 | (WO) . |
| WO 99/21477 | 5/1999 | (WO) . |

* cited by examiner

*Primary Examiner*—Kent Chang
(74) *Attorney, Agent, or Firm*—Oppenheimer Wolff & Donnelly, LLP

(57) ABSTRACT

A computer program, system and method to track motion and control navigation and display of an object viewer. Information content generated by a digital processor is mapped into a virtual display space suitable for conveying the information to a user. A certain portion of the virtual display space is displayed using a display device coupled to the digital processor. An image capture device captures an image from which a reference navigation target is acquired. Tracked movement of a display device relative to the reference navigation target is used to update the displayed certain portion of the virtual display space in a manner related to the tracked movement.

90 Claims, 12 Drawing Sheets

MOTION DETECTION AND TRACKING SYSTEM TO CONTROL NAVIGATION AND DISPLAY OF OBJECT VIEWERS

CROSS REFERENCE TO RELATED APPLICATION

This application is a continuation in part of Flack et al.'s co-pending United States Patent application Ser. No. 09/328,053, filed Jun. 08, 1999 and entitled "Motion Driven Access To Object Viewers," which is incorporated herein by reference in its entirety.

BACKGROUND OF THE INVENTION

The present invention relates generally to user interfaces. More specifically, the invention relates to a computer interface providing motion detection and tracking to control navigation and display of multi-dimensional object databases using a reference navigation target.

In the last few decades, enormous progress has occurred in developing and perfecting interactions between humans and computer systems. Improvements in user interfaces along with improvements in data capacity, display flexibility, and communication capabilities have lead to the widespread use of applications such as Internet browsers, e-mail, map programs, imaging programs and video games that can be generally described as providing content-rich information to the user. While a discussion of the various stages of user interface evolution is unnecessary, the following highlights of that evolution are illustrative, providing a basis for understanding the utility of the invention claimed herein.

Traditional computer human interfaces 10 exist in a variety of sizes and forms including desktop computers, remote terminals, and portable devices such as laptop computers, notebook computers, hand held computers, and wearable computers.

In the beginning of the personal computer era, the desktop computer, which is still in use today, dominated the market. FIG. 1 portrays a traditional desktop computer human interface 10. The traditional desktop computer 10 typically includes a display device 12, a keyboard 14, and a pointing device 16. The display device 12 is normally physically connected to the keyboard 14 and pointing device 16 via a computer. The pointing device 16 and buttons 18 may be physically integrated into the keyboard 14.

In the traditional desktop computer human interface 10, the keyboard 14 is used to enter data into the computer system. In addition, the user can control the computer system using the pointing device 16 by making selections on the display device 12. For example, using the pointing device the user can scroll the viewing area by selecting the vertical 38 or horizontal 36 scroll bar.

As semiconductor manufacturing technology developed, portable personal computers such as notebook and hand held computers became increasingly available. Notebook and hand held computers are often made of two mechanically linked components, one essentially containing the display device 12 and the other the keyboard 14 and pointing device 16. Hinges often link these two mechanical components with a flexible ribbon cabling connecting the components and embedded in the hinging mechanism. The two components can be closed like a book, often latching to minimize inadvertent opening.

The notebook computer greatly increased the portability of personal computers. However, in the 1990's, a new computer interface paradigm emerged which enabled even greater portability and freedom and gave rise to the Personal Digital Assistant 20 (PDA hereafter). One of the first commercially successful PDAs was the Palm product line (PalmPilot™) now manufactured by 3Com. These machines are quite small, lightweight and relatively inexpensive, often fitting in a shirt pocket, weighing a few ounces and costing less than $400 when introduced. These machines possess very little memory (often less than 2 megabytes), a small display 28 (roughly 6 cm by 6 cm) and no physical keyboard. The pen-like pointing device 26, often stored next to or on the PDA 20, is applied to the display area 28 to enable its user to make choices and interact with the PDA device 20. External communication is often established via a serial port (not shown) in the PDA connecting to the cradle 22 connected by wire line 24 to a traditional computer 10. As will be appreciated, PDAs such as the PalmPilot™ have demonstrated the commercial reliability of this style of computer interface.

FIG. 2 displays a prior art Personal Digital Assistant 20 in typical operation, in this case strapped upon the wrist of a user. At least one company, Orang-otang Computers, Inc. sells a family of wrist mountable cases for a variety of different PDAs. The pen pointer 26 is held in one hand while the PDA 20 is held on the wrist of the other hand. The display area 28 is often quite small compared to traditional computer displays 12. In the case of the Palm product line, the display area 28 contains an array of 160 pixels by 160 pixels in a 6 cm by 6 cm viewing area. Often, part of the display area is further allocated to menus and the like, further limiting the viewing area for an object such as an e-mail message page. This limitation in viewing area is partially addressed by making the menu bar 34 (FIG. 1) found on most traditional computer human interface displays 12 invisible on a PDA display 28 except when a menu button 29 is pressed.

Object database programs, such as map viewers, present a fairly consistent set of functions for viewing two-dimensional sheets. Where the object being viewed is larger than the display area of the display, controls to horizontally and vertically scroll the display area across the object are provided. Such viewing functions often possess visible controls accessed via a pointing device. As shown in FIG. 1, horizontal scrolling is often controlled by a slider bar 36 horizontally aligned with a viewing region 40. Vertical scrolling is often controlled by a vertical slider bar 38 vertically aligned with the viewing region 40. Additionally such database interfaces often possess functionality to scroll in directions other than the vertical and horizontal orthogonal directions. This function is usually controlled by pointing to an icon, such as hand icon 42, which is then moved relative to the viewing area 40 while holding down the button 18.

Furthermore, object viewers often incorporate the ability to zoom in or out to control the resolution of detail and the amount of information visible upon the display device. Zoom out and zoom in controls 30, 32 are often either immediately visible or available from a pull down menu as items in one or more menu bars 34.

Finally, object viewers often include the ability to traverse a hierarchical organization of collections of objects such as folders of e-mail messages, log files of FAXes, project directories of schematics or floor plans, Internet web page links and objects representing various levels or sub-systems within a multi-tiered database.

In summary, traditional computer human interfaces 10, 20 have been employed in a variety of contexts to provide interactivity with multi-dimensional and/or multi-tiered object programs and systems. These interfaces superficially appear capable of providing a reasonable interface. However, size limitations and associated barriers, drastically limit their functionality and interactivity. When the desired size (e.g. width and/or height) of the object's display format is larger than the size of the display screen itself, a method must be used to control which portion of the object is to be displayed on the screen at any given time. Various methods, in addition to those described above, have been devised to activate pan and scroll functions such as pushing an "arrow" key to shift the display contents in predefined increments in the direction indicated by the arrow key. Alternatively, a pen pointer or stylus can be used to activate pan and scroll functions to shift the display contents. In all of these examples, the physical display device remains relatively stationary and the larger object is viewed piece-wise and sequentially in small segments corresponding to the limitations of the physical size of the display screen.

In actual practice, these typical methods have many inherent problems. If the display screen is small relative to the object to be viewed, many individual steps are necessary for the entire object to be viewed as a sequence of displayed segments. This process may require many sequential command inputs using arrow keys or pen taps, thus generally requiring the use of both hands in the case of hand held computers. Furthermore, the context relationship between the current segment displayed on the screen and the overall content of the whole object can easily become confusing.

What is needed is a system that provides a simple and convenient method to control the display contents that also preserves the user's understanding of the relationship between the current segment on the display and the overall content of the object. Such a method is of particular value for personal information appliances such as hand held computers and communications devices with small display screens. Such appliances must satisfy the conflicting requirements of being small and convenient on the one hand and having the performance and utility of modern laptop or desktop computers on the other. Preferably, the method allows for single-handed control of the display contents.

SUMMARY OF THE INVENTION

The present invention addresses the aforementioned problems by providing a new method to control the contents presented on a small display screen. The present invention allows the user to easily traverse any and all segments of a large object using a hand held device with a small display screen. By moving the device in the direction the user is interested in, the user is allowed to traverse an object that is much larger than the display.

A device in accordance with one aspect of the present invention includes a digital processor, a computer memory, a computer readable medium, a display device, and a means for detecting motion of the display device relative to a reference navigation target. The digital processor is operable to map information resident in the computer readable medium into a virtual display space suitable for conveying the information to the user. The processor from time to time acquires data from the motion detecting means and uses the acquired data to calculate the position of the device relative to the user of the device. Based upon the calculated position of the device relative to the user, the processor displays upon the display device selected portions of the virtual display space. The motion detecting means preferably includes tracking movement of the device relative to a reference navigation target including a unique set of features, and more particularly, the set of features common to all computer users: the human head, face and/or shoulders.

Another aspect of the present invention provides a method for assisting a user in preserving awareness of the context of each displayed segment during the control and operation of a computer system while traversing objects having display formats that are larger than the display. This method begins by mapping the full sized object intended for display by the computer system into a virtual display space. Next, a certain portion of the virtual display space is actually displayed. Then, an image is captured by a motion detecting means and a reference navigation target is acquired from the captured image. Finally, the movement of the device is tracked relative to the reference navigation target and the displayed portion of the virtual display space is changed in a manner correlated to the tracked movement. Preferably the movement of the device is tracked relative to a reference navigation target including the unique human feature set of the head, face and/or shoulders of the user.

In especially preferred embodiments, the aforementioned object is a type of detailed or content-rich information such as a geographic map, electronic schematic, video or still image, text document or Internet web page. The hand held device is a personal information appliance such as a hand held computer or mobile communication device capable of displaying text and/or graphical information, albeit on a display sized appropriately for a hand held, wearable or pocketable personal information appliance. This aspect of the present invention allows the user to traverse the object as described above. In addition, the user can use other functions of the personal information appliance, such as taking notes, conversing with others or recording messages, while using the virtual display space display management application of the present invention.

DETAILED DESCRIPTION OF THE INVENTION

Central to this invention is the concept that motion of a display device relative to a reference navigation target controls an object viewer, where the object being viewed is typically essentially stationary in virtual space in the plane of the display device. One or more imaging devices, such as cameras, mounted on the display device and operably coupled to a motion processor are operable to capture an image from which the motion processor acquires a reference navigation target. The reference navigation target preferably includes a unique feature set such as a user's head, face and/or shoulders. The reference navigation target may also include an item having a unique feature set which is attached to the body of the user or to the clothing of the user. The motion processor tracks the movement of the display device relative to the reference navigation target and provides a motion data vector to a digital processor. The digital processor updates a displayed portion of the object in a manner related to the tracked movements of the display device. In this manner the user is able to traverse the entire object and examine the entire object either as a whole or as a sequence of displayed segments.

A unique human feature set, such as a user's head, face and/or shoulders, is optimally suited for this purpose as in any useful application of the display device, a user is typically positioned in front of the display device and looking at the display screen of the display device. Thus, the cameras can be conveniently positioned and oriented to capture the intended feature set for motion tracking.

Figure 1:
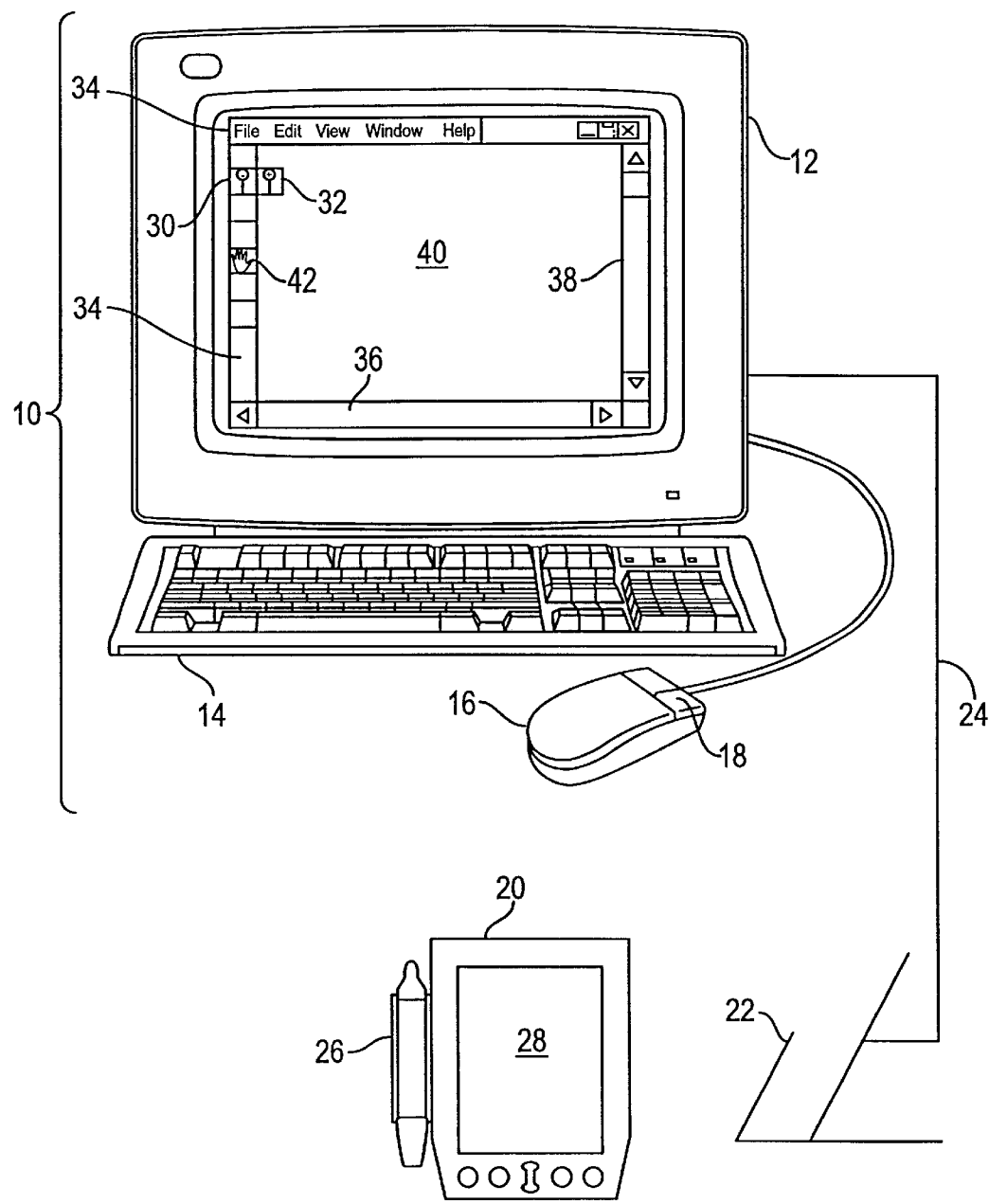
FIG. 1 displays a prior art system including a traditional computer human interface and a Personal Digital Assistant.
Figure 2:
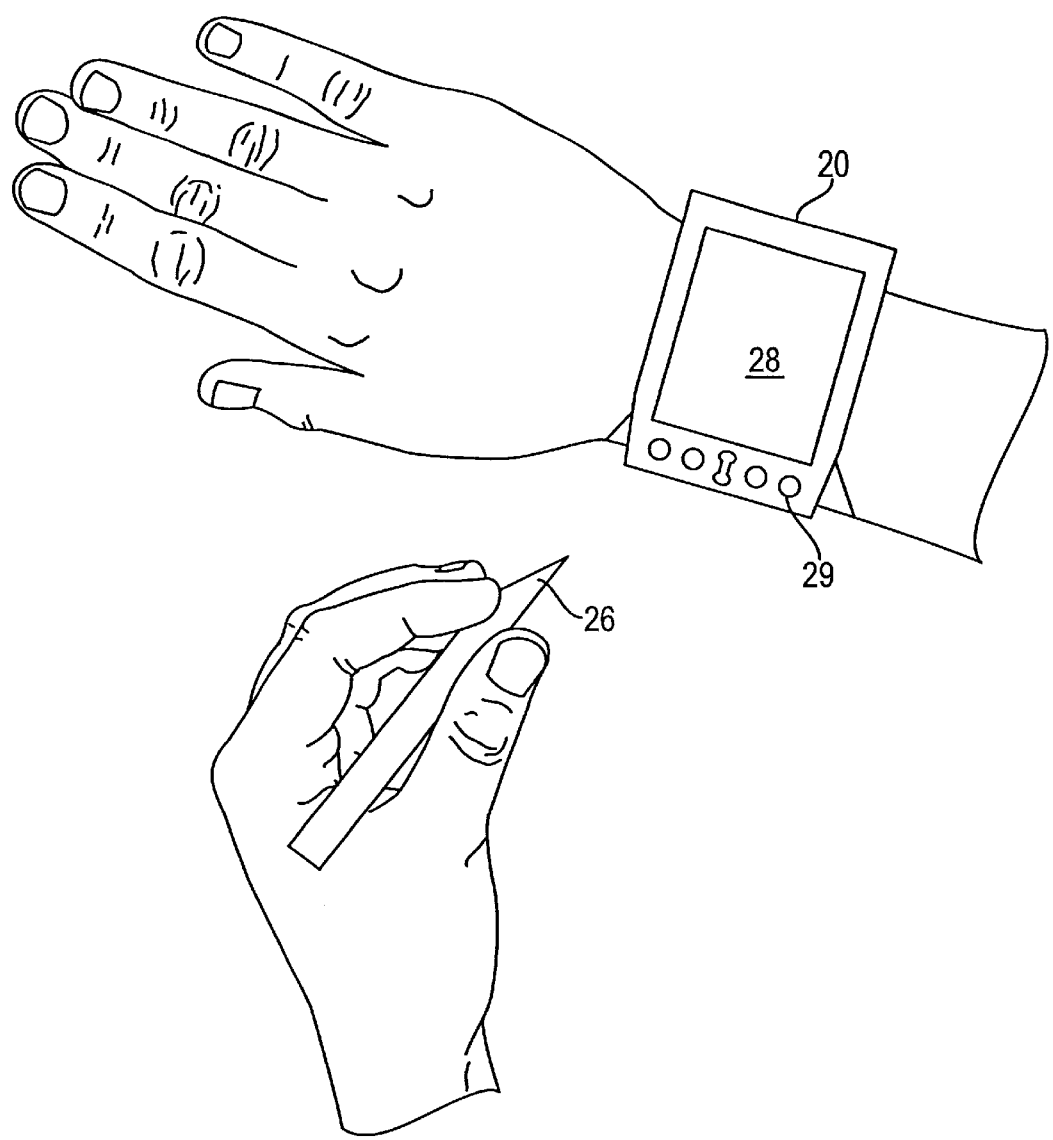
FIG. 2 displays a prior art Personal Digital Assistant in typical operation.
Figure 3:
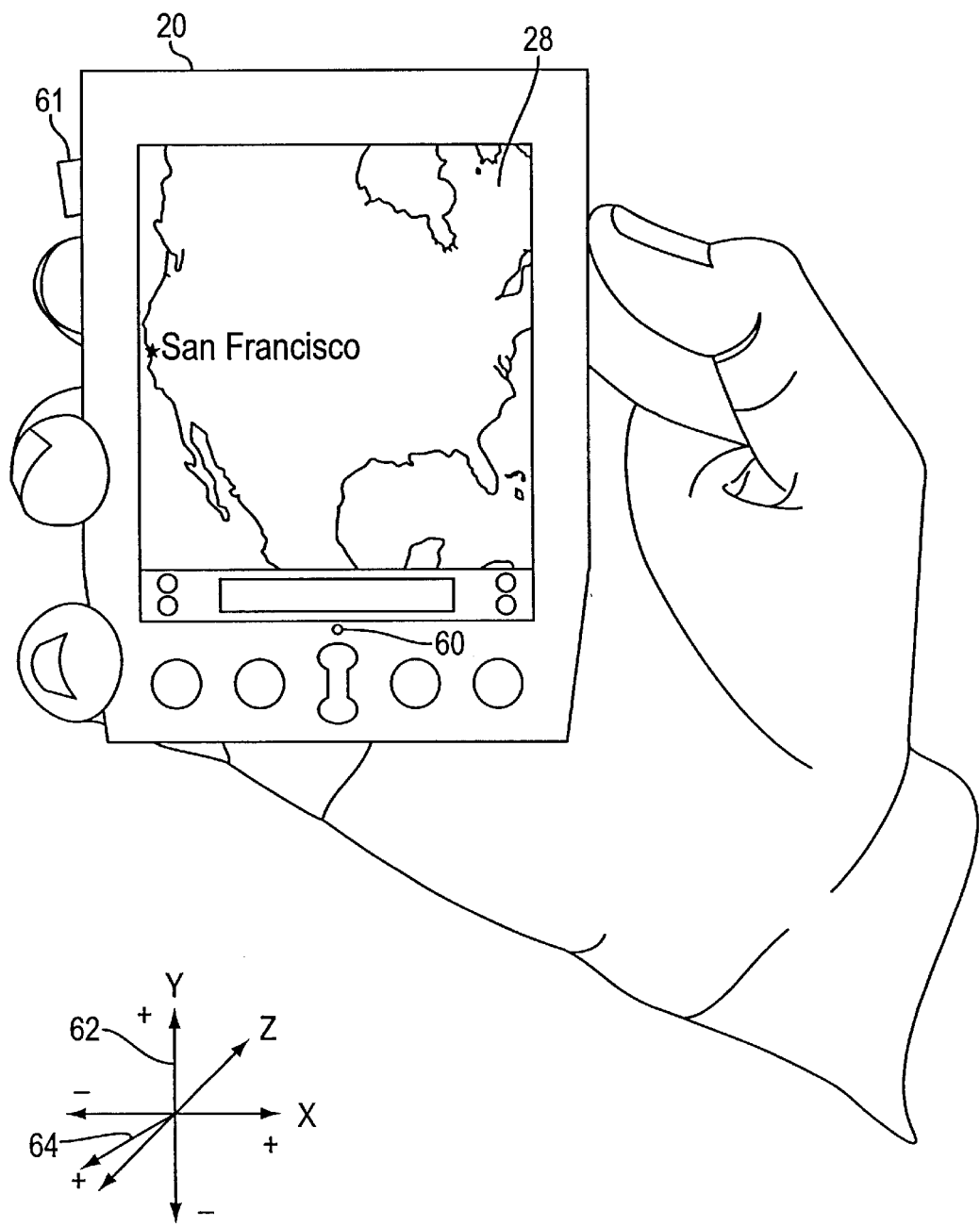
FIG. 3 depicts a hand held computer having a video camera for detecting motion of the computer relative to the user in accordance with one embodiment of the current invention and a motion template to be used hereafter to describe the user's control interaction.

FIG. 3 depicts a hand held computer 20 in accordance with one embodiment of the current invention, including a video camera 60 oriented in such manner that the user's unique feature set is captured when the user is viewing the display device 28. In an unillustrated embodiment, additional cameras may be mounted on the computer 20 to achieve the objects of the invention. Also included in FIG. 3 is a motion template 62 to be used hereafter to describe the user's control interaction. The hand held computer 20 is considered to have a processor internal to the case controlling the display device 28.

The display device 28 shown in FIG. 3 is disposed in the same housing as the computer 20. The present invention is not limited to devices wherein the display device 28 and computer 20 are physically attached or disposed in a unitary housing. In the case where the display device and computer are remote one from the other, whether connected by wire or by wireless connection, the imaging device or devices are disposed upon or within the housing of the display device to capture the image in accordance with the present invention.

Figure 4:
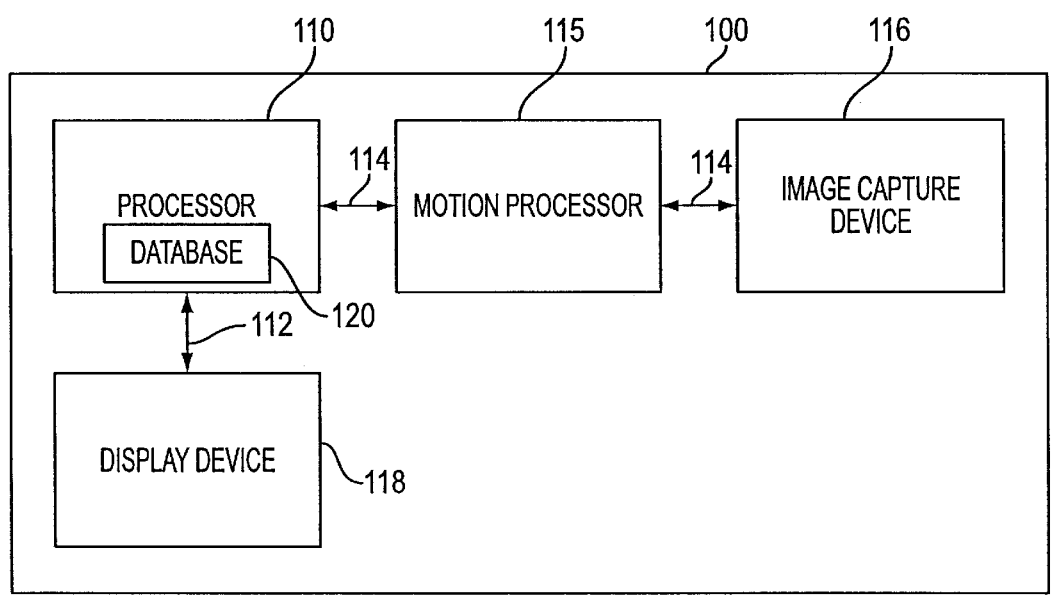
FIG. 4 depicts a system block diagram in accordance with one preferred embodiment of the current invention with an embedded database incorporated in the processor and local motion processing means.

The video camera(s) 60 are preferably coupled to a motion processor for providing the internal processor with a motion vector measurement. Note that the various components of the motion vector measurement may be sampled at differing rates. FIG. 4 depicts such system. The processor 110 incorporates an embedded database 120. Coupled to the processor via connection 114 are a motion processor 115 and camera 116. Also coupled to the processor 110 via connection 112 is a display device 118. The connections 112, 114 may be wired or wireless, the only constraint being that the camera 116 is disposed on the display device 118. The motion processor preferably provides the ability to determine rotation of the hand held display device, while simultaneously determining translational motion. In a preferred embodiment of the invention, certain features of the reference navigation target, such as the relative apparent size of a user's head or the relative distance between the user's eyes, are used to enable zoom control to adjust the resolution of detail and/or the amount of information visible upon the display device.

The motion processor generates a motion vector relative to a frame of reference including the reference navigation target. Some preferred embodiments will use a 2-D frame of reference while other embodiments will use a 3-D frame of reference. Some preferred embodiments will use a rectilinear axis system, other embodiments will use a radial axis system. In a preferred embodiment, the origin will be positioned at a prominent feature of the reference navigation target, such as the human nose.

The hand held device 20 may be further preferably augmented with other control inputs such as voice commands or button 61 on one side of the hand held computer 20. The control inputs may be operable to activate and/or deactivate the motion controlled display management function. Additionally, these control inputs may be operable to freeze the display upon activation or to freeze movement of the display in a desired axial or radial direction. Note that for the purpose of this invention, such controls, if buttons, may be positioned on any side or face of the hand held device 20.

Figure 5:
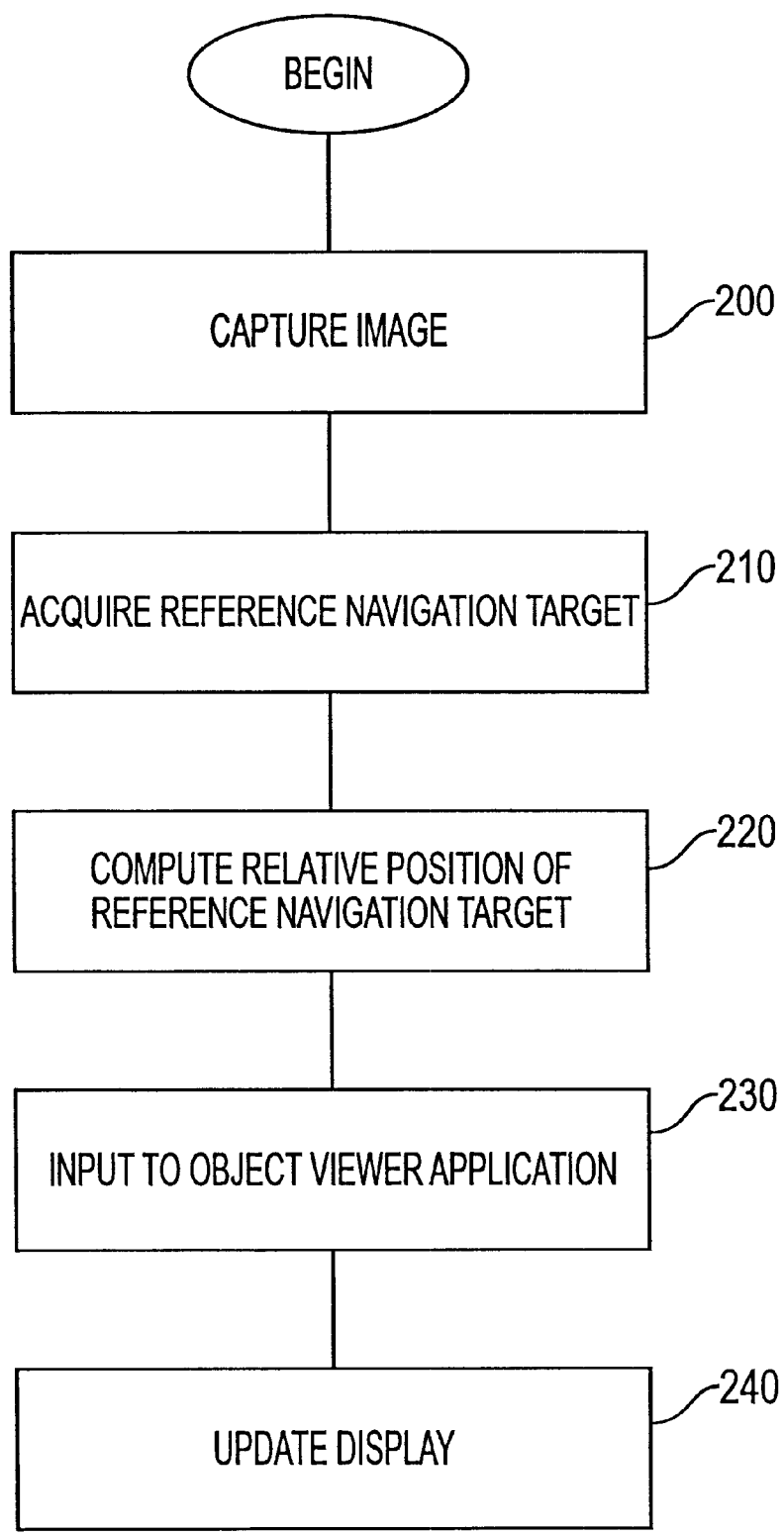
FIG. 5 depicts a flow chart of the method in accordance with one preferred embodiment of the present invention.

The motion detection and tracking system of the present invention includes at least one image capture device such as a camera, image storage capabilities, image processing functions and display device motion estimation functions. With reference to FIG. 5, in operation 200 an image capture device provides a captured image of the environment in the immediate vicinity of the hand held device such as a view of the user's head, face and shoulders. Image storage capabilities maintain one or more reference images representing feature sets of one or more navigation reference targets such as a generic representation of a user's head, face and shoulders and/or current and previous captured images that can be used by the image processing function. In operation 210, the image processing function uses one or more captured images to acquire and identify the location of the navigation reference target such as a user's head, face and/or shoulders in the field of view of the image capture device. Pre-stored generic reference image data may be utilized as an aid to identify the navigation reference target within an image frame containing other foreground and background image data. In operation 220, the motion estimation process then computes the relative position of the navigation reference target with respect to the display device using growth motion, relative motion, stereoscopic photogrammetry or other measurement processes. This new relative position of the navigation reference target is compared with its previous estimated position and any changes are converted into new motion and position estimates of the display device. As the position of the display device relative to the reference navigation target is updated by the motion estimation process, an operation 230 makes this information available to an object viewer application that controls the content of the display on the display device. In operation 240, the displayed portion of a virtual display space is updated in a manner related to the tracked movement.

The present invention has a variety of practical uses. One embodiment of the present invention would allow a user to traverse a map database using only motion. FIG. 3 depicts a hand held computer 20 running a map viewer database application. The database contains maps of various U.S. geographic regions for display on the computer display device 28.

Figure 6:
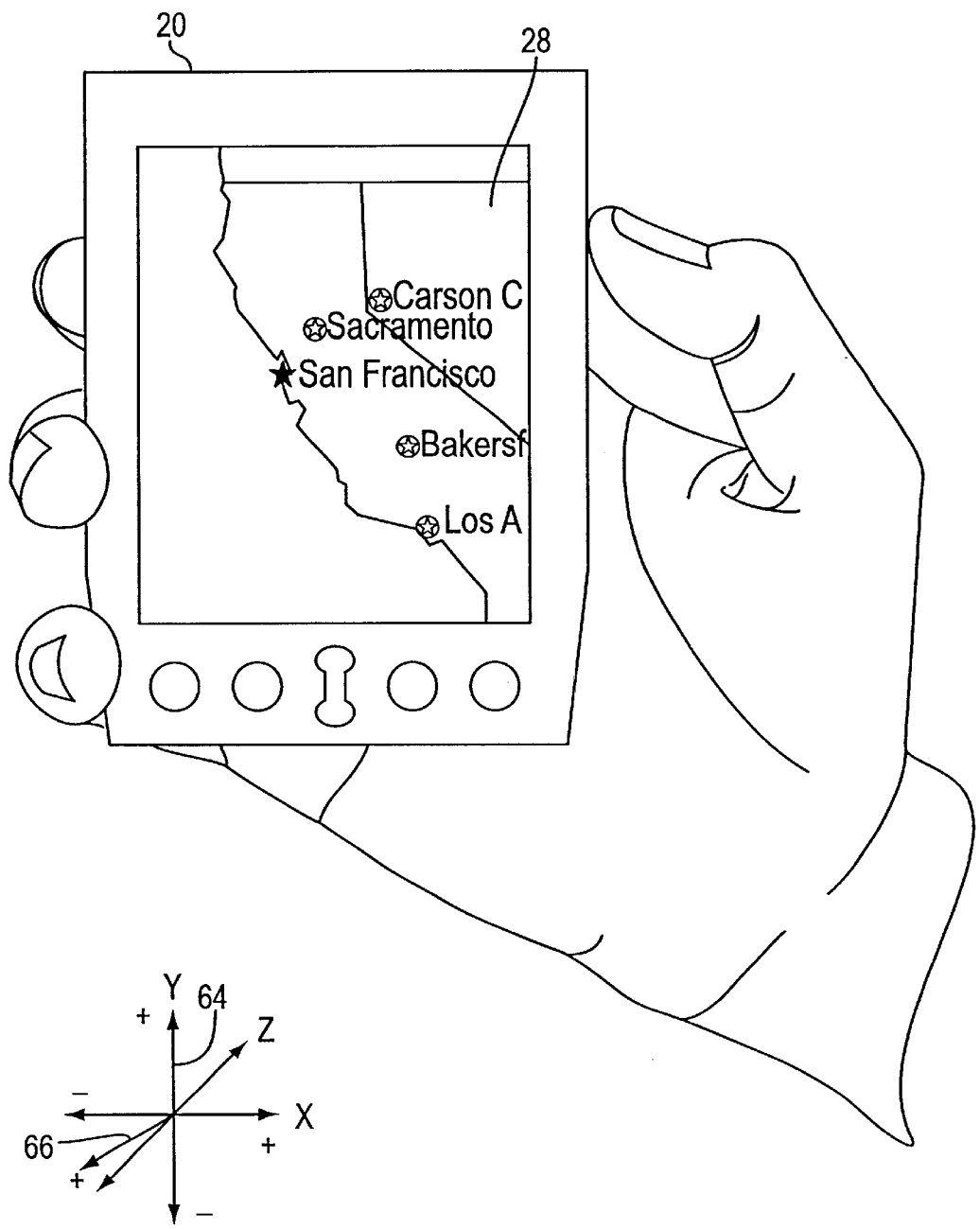
FIG. 6 depicts the initial display for a map viewing application in accordance with one embodiment of the current invention with the user indicating a zoom and scroll to focus in on California.
Figure 7:
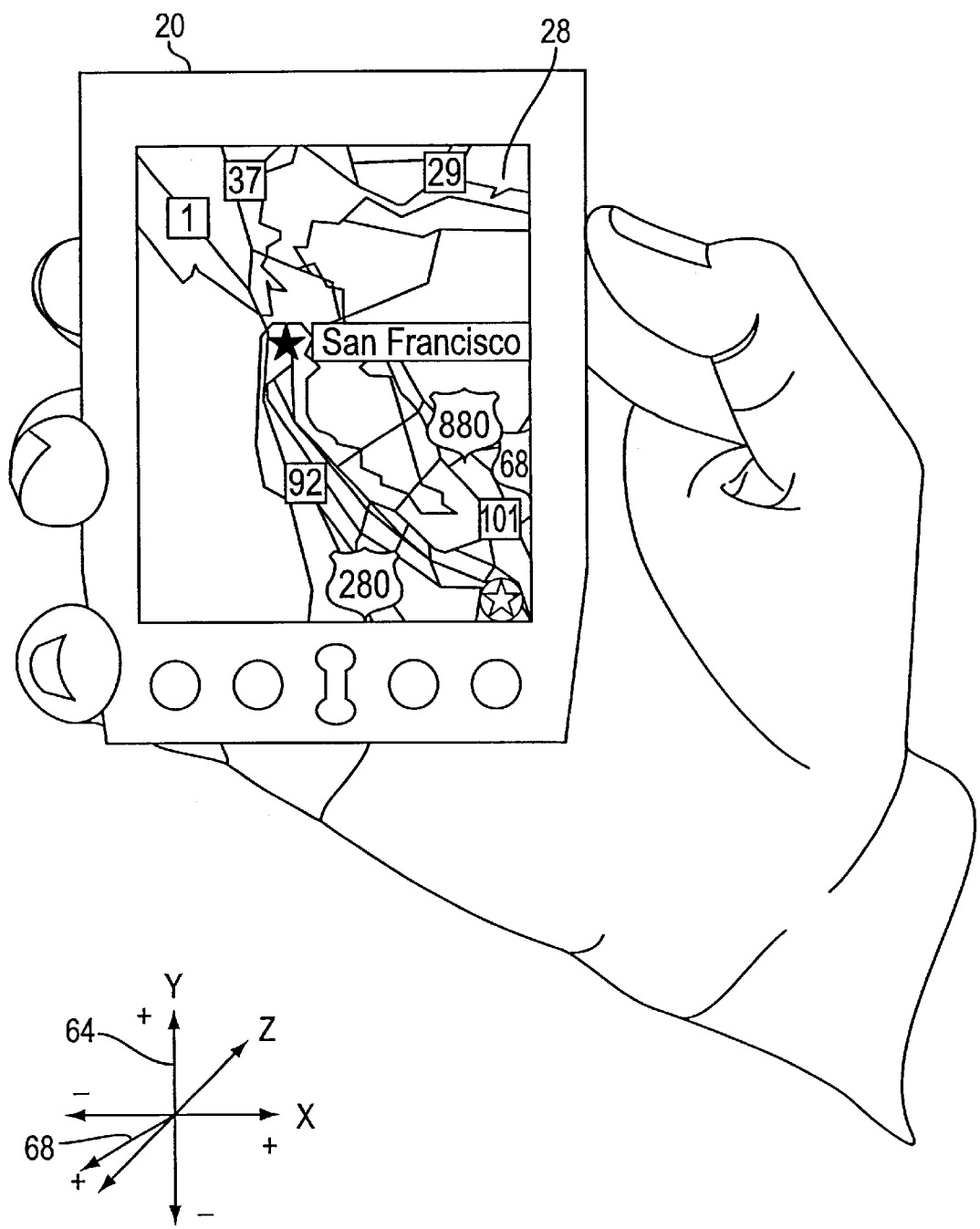
FIG. 7 depicts the result of the user control interaction of the previous figure showing a map of California and displaying the next user control interaction, which will cause the display to zoom and focus on the San Francisco Bay Area.
Figure 8:
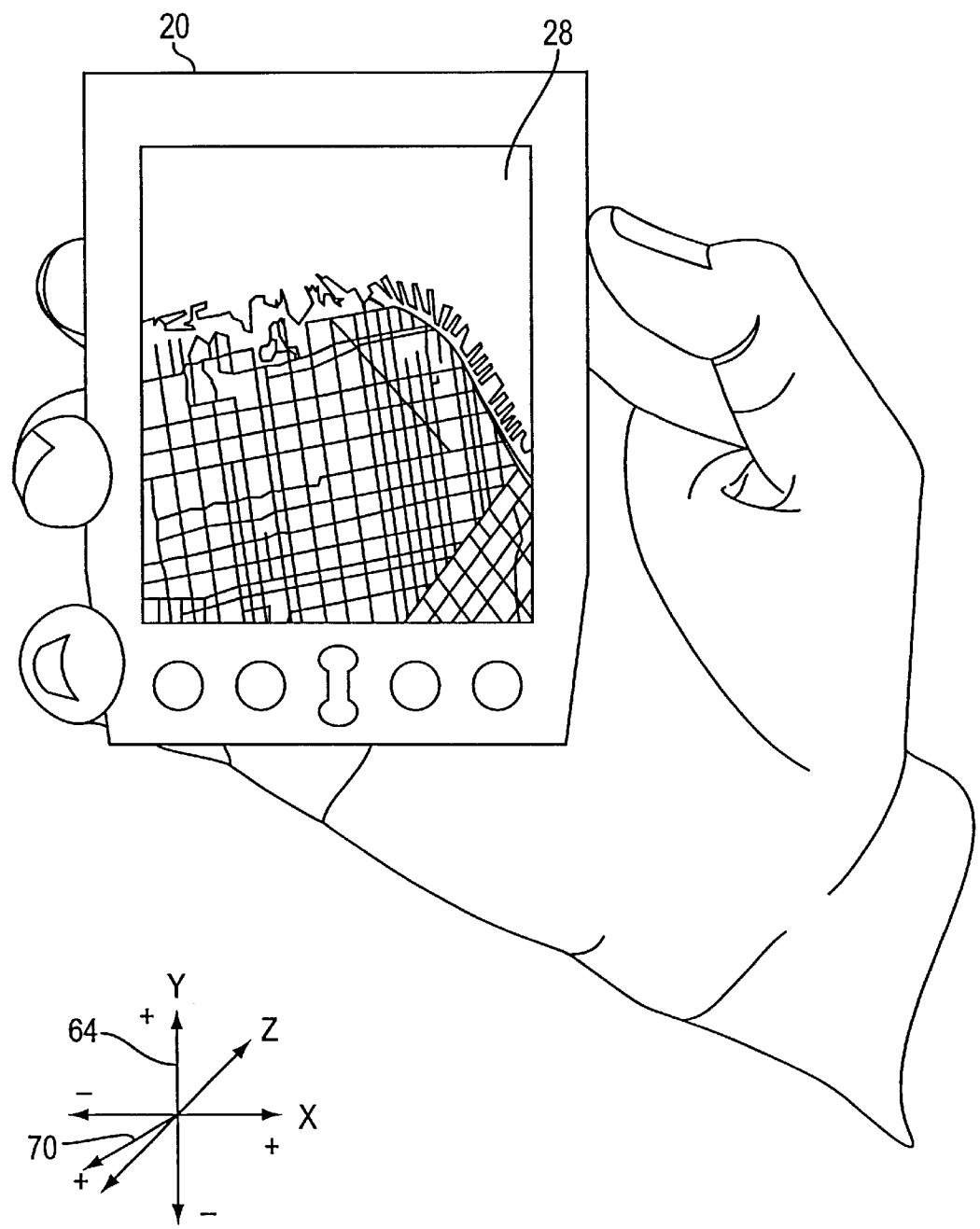
FIG. 8 depicts the result of the user control interaction of the previous figure showing a map of San Francisco Bay Area and displaying the next user control interaction, which will cause the display to zoom and focus on the waterfront of San Francisco.
Figure 11:
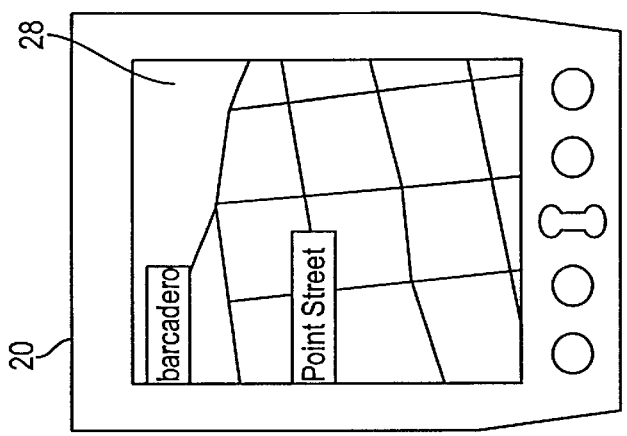
FIGS. 9, 10 and 11 depict the results of the user control interaction of the previous figure showing a map of the San Francisco waterfront and displaying the next user control interaction, which will cause the display to zoom and focus on a portion of the San Francisco waterfront.
Figure 11:
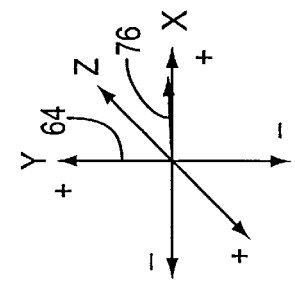
Figure 10:
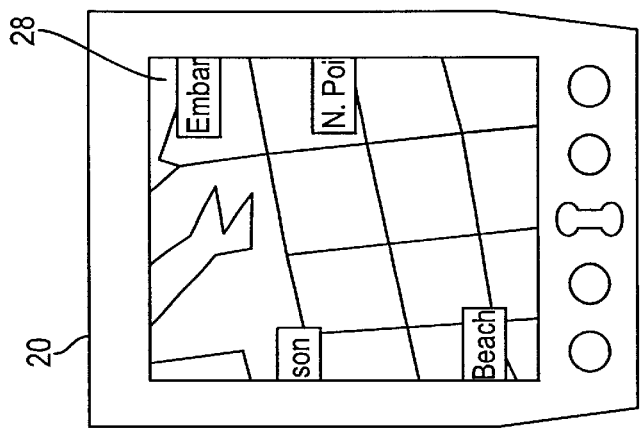
Figure 10:
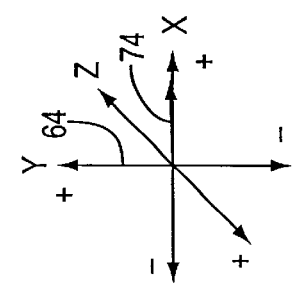
Figure 9:
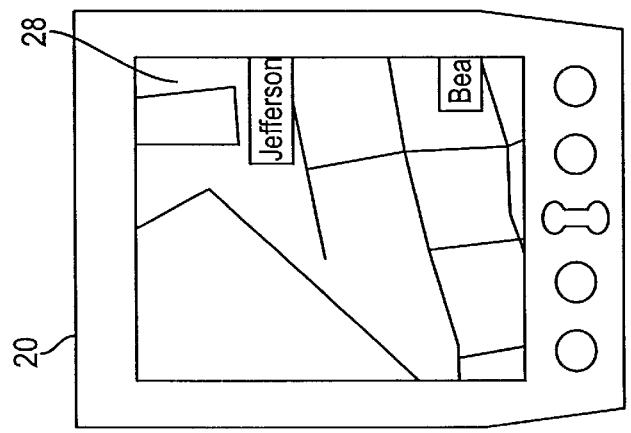
Figure 9:
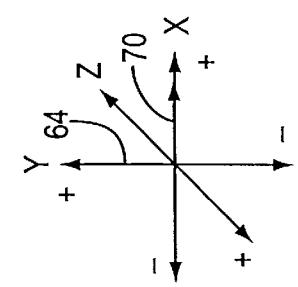

By moving the hand held computer 20 along the positive z-axis, the user can zoom to a more specific region of the map, such as a closer view of California as depicted in FIG. 6. Continued movement along the positive z-axis allows the user to zoom to more specific regions, such as the San Francisco Bay Area (FIG. 7), the San Francisco waterfront (FIG. 8), and finally to a detailed street map of the San Francisco waterfront (FIGS. 9, 10, and 11).

At any zoom level, the user can move the hand held computer 20 along the x-axis, y-axis, or both, to explore the map in the corresponding direction. FIG. 9 depicts an area of the San Francisco waterfront. By moving the hand held computer 20 along the positive x-axis 70, the user can explore the map in an eastward direction as depicted in FIG. 10. Continued movement along the positive x-axis 74 will result in more eastward exploration as depicted in FIG. 11.

Figure 12:
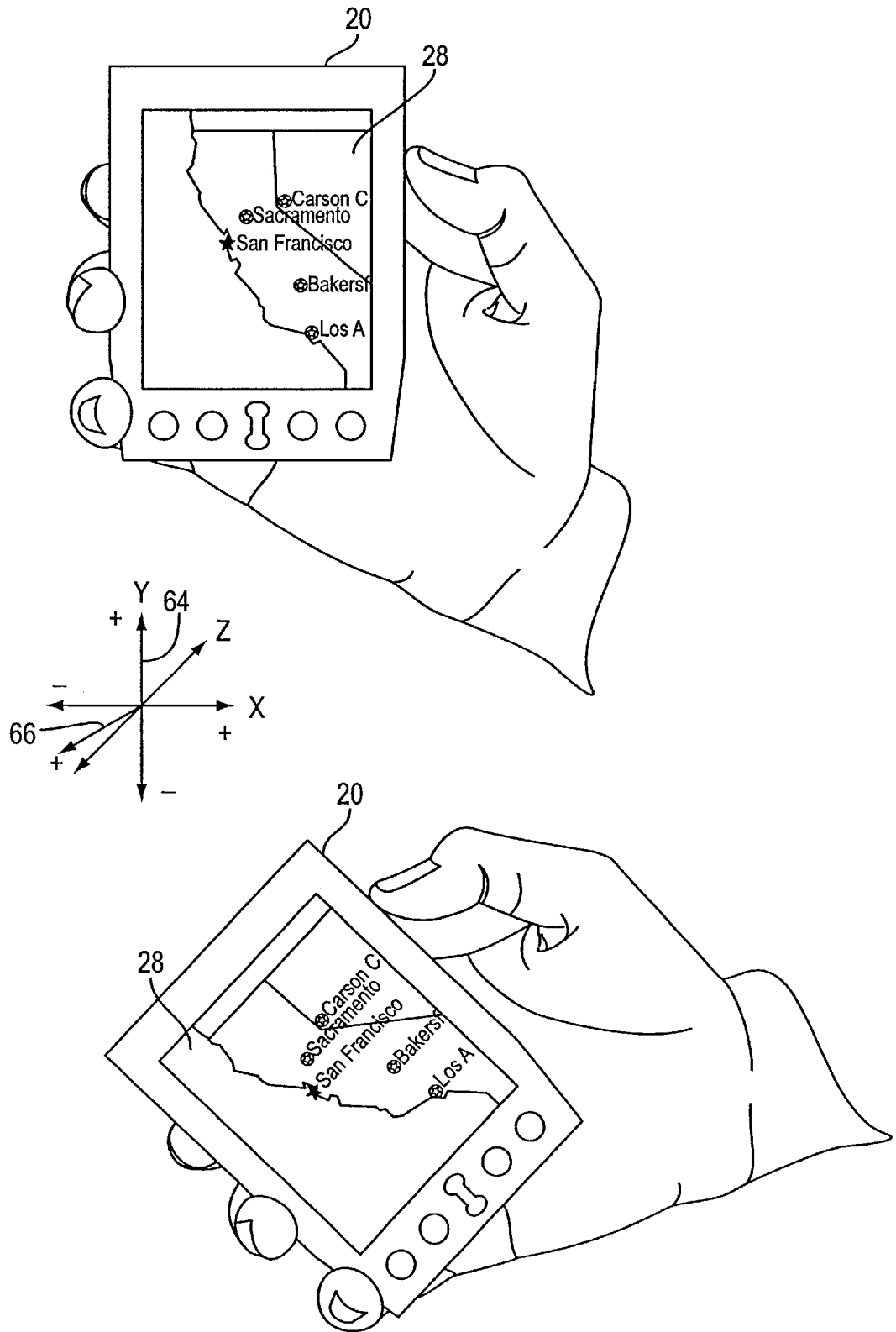
FIG. 12 depicts the result of rotational movement of the hand held computer without rotational translation.

FIG. 12 depicts the result of rotational movement of the hand held computer 20. In this case the display 28 does not change when the computer 20 is rotated along an axis. Note, however, that other embodiments of the invention may include tracking capabilities allowing the invention to track rotation of the computer 20 and enabling the display 28 to be altered according to the rotation of the computer 20. This embodiment would enable a 2-D display to be rotated in 3-D space to present various viewpoints of a 3-D database within the device.

Figure 13:
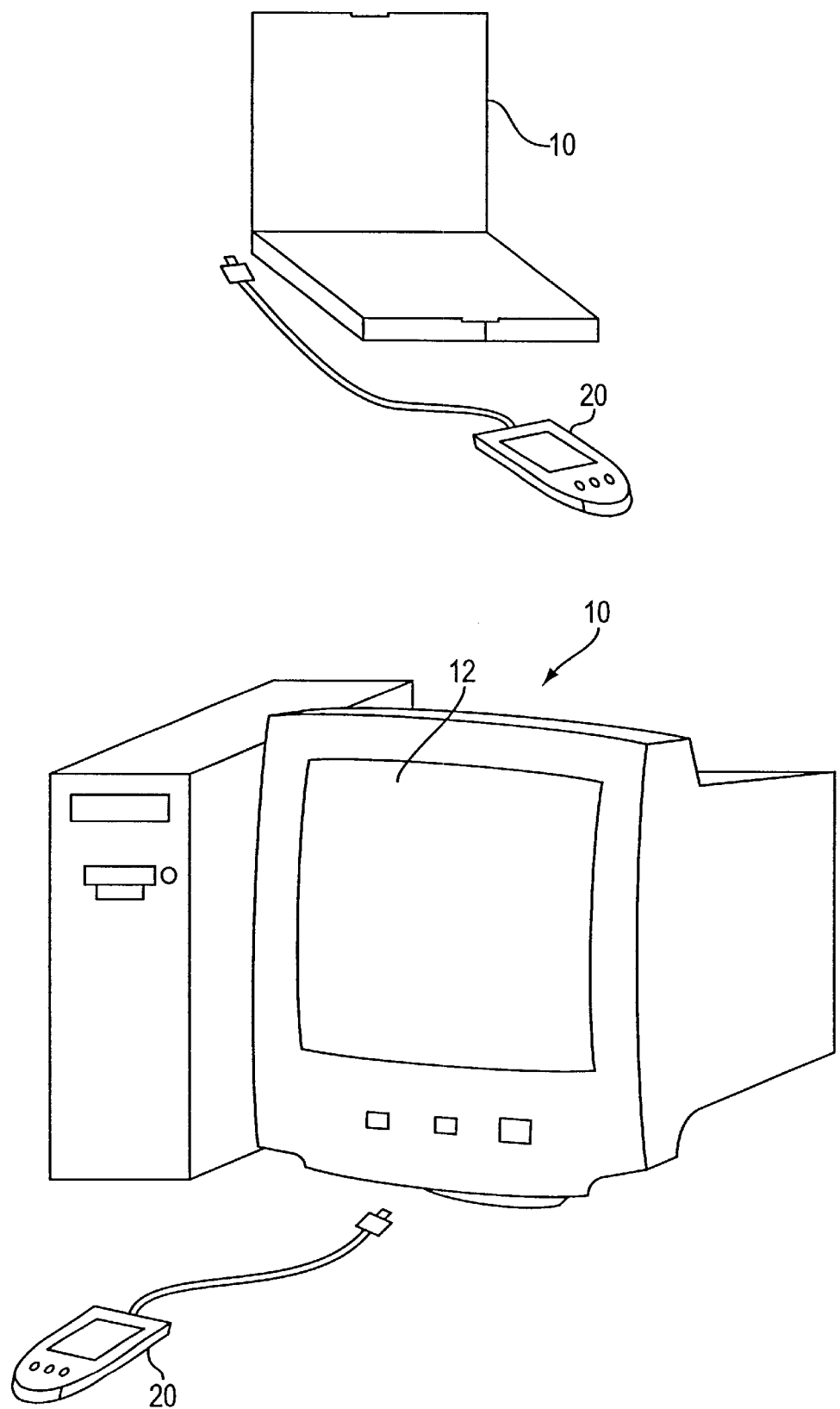
FIG. 13 depicts a hand held computer in conjunction with a laptop and desktop computer in accordance with one embodiment of the present invention.

A further embodiment of the present invention utilizes a hand held computer 20 in conjunction with a traditional laptop or desktop computer 10, as shown in FIG. 13. The hand held computer 20 includes a motion detecting means as previously described. The hand held computer 20 is coupled to the desktop computer 10 utilizing an electronic coupling means, including a connecting wire, infrared, or radio transmissions.

This embodiment enables a user to utilize the hand held computer 20 much like a typical computer mouse. The user is able to move the hand held computer 20 to move, select or control items displayed on the desktop computer's display device 12. In addition, the user is able to traverse virtual objects located in the memory of the hand held device 20 and use this information in conjunction with information contained in the desktop computer 10. For example, a user can use the motion of the hand held computer 20 to traverse a geographic map located in the memory of the hand held device 20. When the user wants to know more information about a specific area of interest currently displayed on the hand held computer's display device, the user can upload the specific geographic coordinates into the desktop computer 10 via the electronic coupling connection. The desktop computer 10 then uses coordinates from the hand held computer 20 in conjunction with an internal database to provide specific geographic information to the user.

In addition, the Internet may be used in conjunction with the desktop computer 10 and hand held computer 20 to provide additional information to the user. This furthers the previous example by utilizing the desktop computer to download additional geographic information utilizing Internet protocol. After uploading the coordinates into the desktop computer, as described above, the desktop computer is then utilized to search the Internet for addition geographical information. The desktop computer can search utilizing the uploaded coordinates from the hand held computer 20 directly, or the coordinates can be used in conjunction with an internal database to provide Internet search parameters. Once appropriate information is obtained from the Internet, it can be further downloaded into the hand held computer 20. For example, a more detailed geographic map may be downloaded from the Internet to the desktop computer 10 and subsequently uploaded to the hand held computer 20 for further traversal by the user. In this way, the information able to be displayed and utilized by the hand held computer 20 is greatly increased.

Another embodiment of the present invention could substitute a command, other than motion, from the user to traverse the virtual map. For example, magnification could be controlled by a button 61 while the movement along the x and y axis is still controlled by the motion of the device. Another aspect of the present invention would allow one or more axis to be frozen by the user. The advantage to this arrangement is that accidental movement along that axis would not change the display. For example, the user may want to see what is north of his position. In this case, the user would freeze the x-axis and z-axis, allowing movement only along the y-axis.

Another aspect of the present invention would allow the user to interact with two windows in the display of the device. In one window a map application as described above would run. The other window would run another application, such as a screen capture or word-processing application. For example, while navigating the virtual map in one window, the user could take notes in the other window, or capture a section of the virtual map in the other window. This allows the user to save certain sections of interest in the virtual map for later printing. In addition, if the user has access to another database, such as discussed above in relation to wireless remote systems, information about specific places of interest in the virtual map could be displayed in the one window while the user is traversing the virtual map in the first window.

As will be appreciated, the technology of the present invention is not limited to geographic maps. Object viewers can also include but are not limited to architectural, fluidic, electronic, and optical circuitry maps. Other information content could include conventional pages of documents with text, tables, illustrations, pictures, and spreadsheets. Additionally, the present invention finds particular application in the field of Internet, video telecommunications and hand held video games.

The present invention finds additional application in navigating complex object systems including, for example, MRI images. The present invention allows the user to navigate such an object in an easy and intuitive way. By using the motion driven navigation system of the present invention, a user can navigate from one slice of the MRI image to the next easily using only one hand. Additionally, objects having multiple dimensions can be easily navigated using the system of the present invention. Functions conventionally accomplished by means of manual control inputs such as clicking and dragging are easily performed by translational and/or rotational movement of the device relative to the navigational reference target.

The object viewers and other applications running on the computer system of the present invention use an event queue, a standard element of the operating system and applications of both Palm OS™ and Windows CE, two commonly used real-time operating systems for hand held computers, PDAs, telephone-PDA hybrid devices and the like. An event queue contains events, which are happenings within the program such as mouse clicks or key presses. These events are successively stored in event queues ordered by oldest event first. The specifics of an event structure vary from system to system, and as such this discussion will focus on the most common elements of such entities. An event usually contains a designator as to the type of event, often including but not limited to button down, button up, pen down, pen up. Event queues are serviced by event loops, which successively examine the next provided event in the queue and act upon that event.

Both the PalmOS™ and Windows CE operating systems support at least one application running. Each application consists of at least one event loop processing an event queue. Hardware related events are usually either part of the operating system of the hand held device or considered "below" the level of the application program. "Higher level" event types such as menu selections, touching scroll bars, mouse buttons and the like are often handled in separate event queues, each with a separate concurrently executing event loop. Such concurrently executing program components are often referred to as threads.

Software interfaces to additional hardware, such as optional accessories, are often added to basic systems as threads running independently of the main event loop of each application and concurrently with these application event loops. Such additional event loops may process new hardware events, such as sensor measurements, and generate new data, which is incorporated into events placed into application event queues for application processing. One hardware accessory that the present invention uses is an image capture device that is used for motion detection and tracking.

Figure 14:
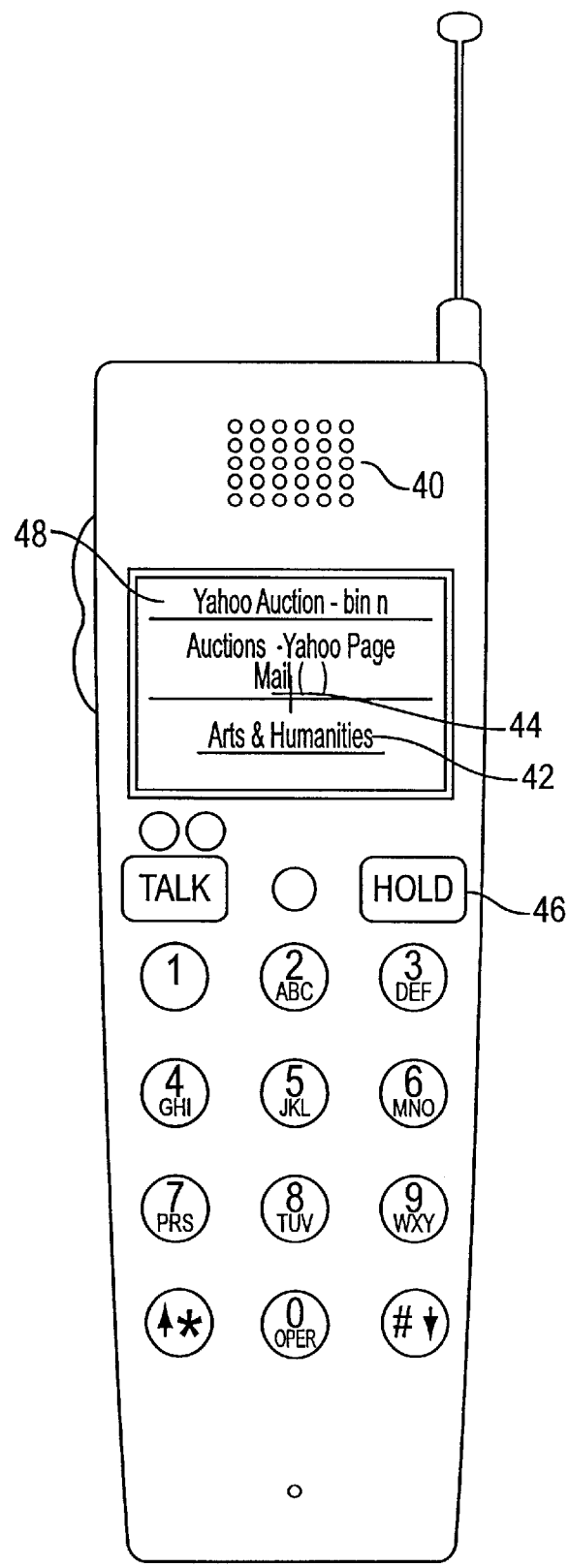
FIG. 14 depicts a personal information appliance in accordance with one embodiment of the present invention.

In yet another preferred embodiment of the present invention, the system of the present invention is used to navigate the World Wide Web. With particular reference to FIG. 14, a personal information appliance including a mobile communication device 40 includes a display screen 42 and an image capture device 46. A cursor 44 may be held stationary with respect to the boundaries of the display screen 42. Tracked movement of the device 40 relative to the reference navigation target as a web page 48 is navigated operates to place the cursor 44 over chosen hyperlinks in the web page 48. Control inputs such as voice commands or buttons (not shown) are operable to select the chosen hyperlink and thereby enable navigation of the World Wide Web.

Although only a few embodiments of the present invention have been described in detail, it should be understood that the present invention may be embodied in many other specific forms without departing from the spirit or scope of the invention. Therefore, the present examples are to be considered as illustrative and not restrictive, and the invention is not to be limited to the details given herein, but may be modified within the scope of the appended claims.

We claim:

1. A computer implemented method for assisting a user in the control and operation of a computer system, the computer system having a display device, the computer system providing information content for display, such information content potentially containing more content such as characters, pictures, lines, links, video or pixels than can be conveniently displayed entirely on the display device at one time, the computer implemented method comprising the acts of:

coupling a display device to a digital processor;

mapping information content generated by the digital processor into a virtual display space suitable for conveying the information to the user;

displaying a certain portion of the virtual display space using the display device;

capturing an image;

acquiring a reference navigation target from the captured image;

tracking movement of the display device relative to the reference navigation target; and updating the displayed certain portion of the virtual display space in a manner related to the tracked movement.

2. A computer implemented method as recited in claim 1 wherein the reference navigation target is attached to a user's body.

3. A computer implemented method as recited in claim 1 wherein the reference navigation target is a part of a user's body.

4. A computer implemented method as recited in claim 1 wherein the reference navigation target is part of a user's clothing.

5. A computer implemented method as recited in claim 1 wherein the reference navigation target is attached to a user's clothing.

6. A computer implemented method as recited in claim 3 wherein the reference navigation target is a user's head.

7. A computer implemented method as recited in claim 3 wherein the reference navigation target is a user's face.

8. A computer implemented method as recited in claim 3 wherein the reference navigation target is a user's head and face.

9. A computer implemented method as recited in claim 3 wherein the reference navigation target is a user's head and shoulders.

10. A computer implemented method as recited in claim 3 wherein the reference navigation target is a user's face and shoulders.

11. A computer implemented method as recited in claim 1 wherein a virtual magnification of the displayed certain portion is updated in a manner correlated to the tracked movement.

12. A computer implemented method as recited in claim 1 wherein a virtual magnification of the displayed certain portion is updated in response to a command entered into the digital processor by the user.

13. A computer implemented method as recited in claim 1 wherein a virtual orientation of the displayed certain portion is updated in a manner correlated to the racked movement.

14. A computer implemented method as recited in claim 1 wherein a virtual orientation of the displayed certain portion is updated in response to a command entered into the digital processor by the user.

15. A computer implemented method as recited in claim 1 wherein an application executing upon the digital processor is a multi-dimensional object database application providing a virtual object.

16. A computer implemented method as recited in claim 15 wherein updating the displayed certain portion includes traversing the virtual object in at least one dimension.

17. A computer implemented method as recited in claim 1 wherein updating the displayed certain portion includes scaling the displayed certain portion.

18. A computer implemented method as recited in claim 17 wherein the displayed certain portion is scaled in response to a command entered into the computer system by the user.

19. A computer implemented method as recited in claim 1 wherein the display device and the digital processor are connected remotely by a wire.

20. A computer implemented method as recited in claim 1 wherein the display device and the digital processor are connected remotely by a wireless connection.

21. A computer implemented method as recited in claim 1 wherein the display device and the digital processor are disposed in a personal information appliance.

22. A computer implemented method as recited in claim 21 wherein the personal information appliance is a hand held computer.

23. A computer implemented method as recited in claim 21 wherein the personal information appliance is a mobile communication device.

24. A computer implemented method as recited in claim 21 wherein the personal information appliance has voice messaging capabilities.

25. A computer implemented method as recited in claim 21 wherein the personal information appliance has data messaging capabilities.

26. A computer implemented method as recited in claim 21 wherein the personal information appliance has handwriting recognition capability.

27. A computer implemented method as recited in claim 21 wherein the personal information appliance has voice recognition capability.

28. A computer implemented method as recited in claim 1 wherein the displayed certain portion includes multiple application windows.

29. A computer implemented method as recited in claim 21 wherein the personal information appliance is coupled to a second computer.

30. A computer implemented method as recited in claim 29 further comprising the act of utilizing the personal information appliance to select information displayed on the second computer.

31. A computer system comprising:
    a digital processor;
    a computer memory coupled to the digital processor;
    a display device coupled to the digital processor;
    a motion detector referenced to a reference navigation target and coupled to the display device; and
    a computer program embodied on a computer readable medium coupled to the digital processor, the computer program having computer executable instructions for:
        mapping information content generated by the computer system into a virtual display space suitable for display via the display device;
        displaying a certain portion of the virtual display space via the display device;
        capturing an image;
        acquiring the reference navigation target from the captured image;
        tracking movement of the display device relative to the reference navigation target via the motion detector; and
        updating the displayed certain portion of the virtual display space in a manner correlated to the tracked movement.

32. A computer system as recited in claim 31 wherein the navigational reference target is attached to a user's body.

33. A computer system as recited in claim 31 wherein the navigational reference target is a part of a user's body.

34. A computer system as recited in claim 31 wherein the navigational reference target is part of a user's clothing.

35. A computer system as recited in claim 31 wherein the navigational reference target is attached to a user's clothing.

36. A computer system as recited in claim 33 wherein the navigational reference target is a user's head.

37. A computer system as recited in claim 33 wherein the reference navigation target is a user's face.

38. A computer system as recited in claim 33 wherein the reference navigation target is a user's head and face.

39. A computer system as recited in claim 33 wherein the reference navigation target is a user's head and shoulders.

40. A computer system as recited in claim 33 wherein the reference navigation target is a user's face and shoulders.

41. A computer system as recited in claim 31 wherein a virtual magnification of the displayed certain portion is updated in a manner correlated to the tracked movement.

42. A computer system as recited in claim 31 wherein a virtual magnification of the displayed certain portion is updated in response to a command entered into the digital processor by the user.

43. A computer system as recited in claim 31 wherein a virtual orientation of the displayed certain portion is updated in a manner correlated to the tracked movement.

44. A computer system as recited in claim 31 wherein a virtual orientation of the displayed certain portion is updated in response to a command entered into the digital processor by the user.

45. A computer system as recited in claim 31 wherein an application executing upon the digital processor is a multi-dimensional object database application providing a virtual object.

46. A computer system as recited in claim 45 wherein updating the displayed certain portion includes traversing the virtual object in at least one dimension.

47. A computer system as recited in claim 31 wherein updating the displayed certain portion includes scaling the displayed certain portion.

48. A computer system as recited in claim 47 wherein the displayed certain portion is scaled in response to a command entered into the computer system by the user.

49. A computer system as recited in claim 31 wherein the display device and the digital processor are connected remotely by a wire.

50. A computer system as recited in claim 31 wherein the display device and the digital processor are connected remotely by a wireless connection.

51. A computer system as recited in claim 31 wherein the display device and the digital processor are disposed in a personal information appliance.

52. A computer system as recited in claim 51 wherein the personal information appliance is a hand held computer.

53. A computer system as recited in claim 51 wherein the personal information appliance is a mobile communication device.

54. A computer system as recited in claim 51 wherein the personal information appliance has voice messaging capabilities.

55. A computer system as recited in claim 51 wherein the personal information appliance has data messaging capabilities.

56. A computer system as recited in claim 51 wherein the personal information appliance has handwriting recognition capability.

57. A computer system as recited in claim 51 wherein the personal information appliance has voice recognition capability.

58. A computer system as recited in claim 31 wherein the displayed certain portion includes multiple application windows.

59. A computer system as recited in claim 51, wherein the personal information appliance is coupled to a second computer.

60. A computer system as recited in claim 59, further comprising the act of utilizing the personal information appliance to select information displayed on the second computer.

61. A computer system as recited in claim 31 wherein the motion detector further comprises an image capture device operably coupled to an image processor, operable to acquire the reference navigation target from the captured image and track movement of the display device relative to the reference navigation target.

62. A computer program embodied on a computer readable medium comprising:
 a code segment that maps information content generated by a digital processor into a virtual display space suitable for conveying the information to a user;
 a code segment that displays a certain portion of the virtual display space using a display device;
 a code segment that captures an image;
 a coded segment that acquires a reference navigation target from the captured image;
 a code segment that tracks movement of the display device relative to the reference navigation target; and
 a code segment that updates the displayed certain portion of the virtual display space in a manner related to the tracked movement.

63. A computer program as recited in claim 62 wherein the reference navigation target is attached to a user's body.

64. A computer program as recited in claim 62 wherein the reference navigation target is part of a user's body.

65. A computer program as recited in claim 62 wherein the reference navigation target is part of a user's clothing.

66. A computer program as recited in claim 62 wherein the reference navigation target is attached to a user's clothing.

67. A computer program as recited in claim 64 wherein the reference navigation target is a user's head.

68. A computer program as recited in claim 64 wherein the reference navigation target is a user's face.

69. A computer program as recited in claim 64 wherein the reference navigation target is a user's head and face.

70. A computer program as recited in claim 64 wherein the reference navigation target is a user's head and shoulders.

71. A computer program as recited in claim 64 wherein the reference navigation target is a user's face and shoulders.

72. A computer program as recited in claim 62 wherein a virtual magnification of the displayed certain portion is updated in a manner correlated to the tracked movement.

73. A computer program as recited in claim 62 wherein a virtual magnification of the displayed certain portion is updated in response to a command entered into the digital processor by the user.

74. A computer program as recited in claim 62 wherein a virtual orientation of the displayed certain portion is updated in a manner correlated to the tracked movement.

75. A computer program as recited in claim 62 wherein a virtual orientation of the displayed certain portion is updated in response to a command entered into the digital processor by the user.

76. A computer program as recited in claim 62 wherein an application executing upon the digital processor is a multi-dimensional object database application providing a virtual object.

77. A computer program as recited in claim 76 wherein updating the displayed certain portion includes traversing the virtual object in at least one dimension.

78. A computer program as recited in claim 62 wherein updating the displayed certain portion includes scaling the displayed certain portion.

79. A computer program as recited in claim 78 wherein the displayed certain portion is scaled in response to a command entered into the computer system by the user.

80. A computer program as recited in claim 62 wherein the display device and the digital processor are connected remotely by wire.

81. A computer program as recited in claim 62 wherein the display device and the digital processor are connected remotely by a wireless connection.

82. A computer program as recited in claim 62 wherein the display device and the digital processor are disposed in a personal information appliance.

83. A computer program as recited in claim 82 wherein the personal information appliance is a hand held computer.

84. A computer program as recited in claim 82 wherein the personal information appliance is a mobile communication device.

85. A computer program as recited in claim 82 wherein the personal information appliance has data messaging capabilities.

86. A computer program as recited in claim 82 wherein the personal information appliance has handwriting recognition capability.

87. A computer program as recited in claim 82 wherein the personal information appliance has voice recognition capability.

88. A computer program as recited in claim 62 wherein the displayed certain portion includes multiple application windows.

89. A computer program as recited in claim 82 wherein the personal information appliance is coupled to a second computer.

90. A computer program as recited in claim 89 further comprising a code segment that utilizes the personal information appliance to select information displayed on the second computer.

* * * * *

UNITED STATES PATENT AND TRADEMARK OFFICE
CERTIFICATE OF CORRECTION

PATENT NO. : 6,288,704 B1
DATED : September 11, 2001
INVENTOR(S) : James F. Flack et al.

It is certified that error appears in the above-identified patent and that said Letters Patent is hereby corrected as shown below:

<u>Title page,</u>
Item [75] Inventors, delete the following: "David L. Motte, Ben Lomond";

<u>Column 10,</u>
Line 48 reads: "portion is updated in a manner correlated to the racked"; it should read:
-- portion is updated in a manner correlated to the tracked --

Signed and Sealed this

Twenty-eighth Day of May, 2002

Attest:

JAMES E. ROGAN
Attesting Officer
Director of the United States Patent and Trademark Office